March 31, 1959 H. E. WHITE 2,880,023
FITTING AND SPRING CLIP FOR CONNECTING SAME TO A PIPE
Filed Sept. 26, 1955

INVENTOR.
Herbert E. White
BY
Eber J. Hyde
Attorney

United States Patent Office 2,880,023
Patented Mar. 31, 1959

2,880,023

FITTING AND SPRING CLIP FOR CONNECTING SAME TO A PIPE

Herbert E. White, Cleveland Heights, Ohio

Application September 26, 1955, Serial No. 536,379

6 Claims. (Cl. 287—20)

This invention pertains to a fitting for connection within a pipe and to a spring clip for holding the fitting and pipe together in order that a wide variety of structural forms may be made.

At the present time many persons are constructing their own furniture, trellises, tables, racks, etc. out of pipe. To do a good job, the builder needs many tools and many fixtures. Even with adequate equipment a certain amount of experience is necessary in order to measure all pipe accurately and then connect the pipe to various fittings and have the finished product dimensionally accurate. One of the primary reasons why the inexperienced builder gets his final dimensions slightly wrong is that he cannot allow exactly for the size of the fittings, and he cannot get the pipe uniformly and accurately connected to the fittings. Also, he usually must put the device completely together before he knows whether or not all of his dimensions are accurate; and, if they are not, then he must take the device apart and, if possible, make adjustments in the lengths of the various pipe lengths. The tendency of most amateurs is not to take the device apart and make the final adjustments, but just to use the finished device even though it is not very good.

It is an object of the present invention to provide fixtures and a fixture connecting spring clip for "do it yourself" construction of articles made from pipe which will enable the average "amateur" to quickly and easily build many things of pipe or tubing. With the fixtures and clip of the present invention the average home owner will be able to construct many structural items of pipe, and in factories, warehouses and the like racks, frames, partitions, etc. may be quickly, easily and inexpensively and accurately constructed.

A further object of the invention is to provide fittings for structural pipe work which enable the builder to temporarily put the structure together to accurately check all dimensions, and to provide a spring clip which can thereafter be inserted in each fitting-to-pipe joint to permanently connect the structure together.

It is an object of the invention to provide a spring clip for connecting pipe to structural fittings wherein the pipe and fittings may first be put together without the spring clip to make sure that all dimensions are correct, and thereafter a clip may be incorporated in each joint without any of the dimensions of the device.

Another object of the invention is to provide a completely invisible spring clip for tightly connecting a pipe to a fitting, the clip being entirely within the pipe resulting in a perfectly smooth exterior surface.

Still another object of the invention is to provide structural fittings for structural pipe work and a spring clip for connecting the fitting to the pipe, that is quite inexpensive, the fittings being made by die casting and the spring clip in a progressive die for cost reduction.

For a better understanding of the present invention together with other and further objects thereof, reference is had to the following description taken in connection with the accompanying drawings and its scope will be pointed out in the appended claims.

One aspect of the invention is the combination with standard pipe of a special fitting and a special spring clip for securing the pipe to the fitting, and other aspects of the invention lie in the special fitting and in the special spring clip.

Figure 1:
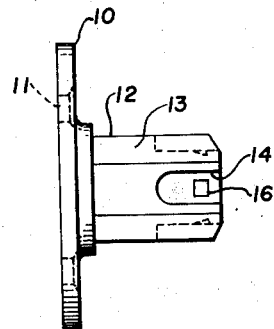
Figure 1 is a side elevation of a fitting in accordance with this invention.
Figure 2:
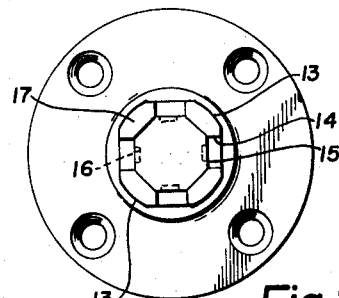
Figure 2 is an end view of the fitting shown in Figure 1.

The fitting shown in Figures 1 and 2 embodies the invention and is a device for terminating a length of pipe perpendicular to a wall or to a floor or ceiling. The invention obviously may be embodied in a wide range of fittings such as standard 30, 45, 60, and 90 degree angles, size reducers, T's, X's, etc. The fitting of Figure 1 is comprised of a flat plate 10 having screw holes 11 by which the fitting may be secured to a floor, wall or the like, and having a projection 12 extending perpendicular to the plate 10. The projection 12, in cross-section, has a plurality of radially spaced contact portions 13 for engagement with the inner wall of a length of standard sized pipe which may be slipped over the projection 12. In between the plurality of spaced contact portions 13 are a plurality of spaced longitudinally extending grooves 14, and the bottoms 15 of the grooves are spaced from the inner wall of a pipe in position around the projection 12. It is preferable to have three or four of the contact portions 13, in which event there will be three or four, respectively, of the intermediate grooves 14.

The bottom 15 of each groove has a notch 16 extending across the groove in a direction substantially perpendicular to the direction of extension of the projection 12. The ends 17 of the contact portions 13 of the projection are beveled to facilitate inserting the projection into a closely fitting pipe.

Figure 3:
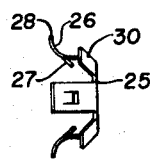
Figure 3 is a side view of the spring clip of the invention.
Figure 4:
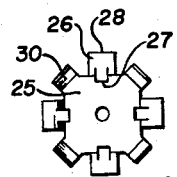
Figure 4 is an end view of the spring clip shown in Figure 3.
Figure 5:
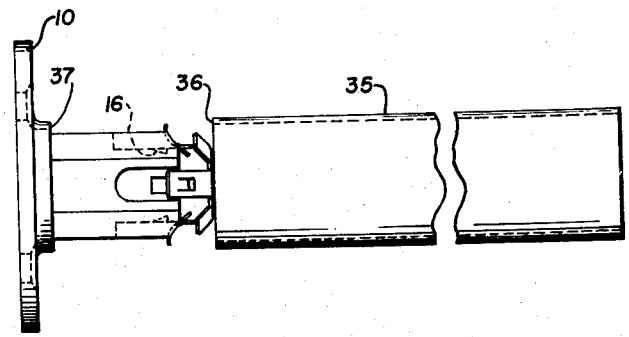
Figure 5 is a side elevation showing the relative positions of the fitting, the pipe and the spring clip as they are put together.

The spring clip is shown in Figures 3 and 4 and comprises a transverse body portion 25 having connected thereto a plurality of radially spaced fitting-engaging spring tabs 26 extending in a direction substantially perpendicular to the plane of the body portion 25. Each of the fitting-engaging spring tabs 26 has a backwards extending spur 27, and each spring tab 26 extends beyond the spur 27 bending outwardly to provide an end 28 for engaging the inner wall surface of a pipe positioned around the projection. The transverse body portion 25 also has connected to its edge a plurality of pipe engaging spring tabs 30, one positioned between each pair of spaced-apart fitting engaging tabs 26. The pipe-engaging tabs extend generally radially outwardly and are sufficiently long that when the spring clip is in position over the end of the projection 12, as shown in Figure 5, the ends of the tabs 26 engage the inner walls of the pipe 35 as the pipe is slid over the projection, thereby bending the spring tabs 26 slightly ahead of the pipe. Each fitting-engaging tab 26 lies in one of the grooves 14, and after the pipe has been pushed onto the fitting until the end 36 of the pipe 35 engages the flange 37 on the fitting the spur 27 locks into the notch 16 in the bottom 15 of the groove, thereby preventing withdrawal of the pipe from the projection. In addition to the spur 27 locking in the notch 16, the sharp edges on the pipe engaging spring tabs 30 dig into the inner wall of the pipe 35. Also, the end 28 of the fitting-engaging spring tab 26 also engages the inner wall of the pipe thereby providing contact between the spring clip and the pipe at two spaced-apart planes, and providing contact between the spring clip and the fitting at one plane intermediate the other two planes. In the unit illustrated there are four grooves 14, four fitting-engaging spring tabs 26 and four pipe-engaging spring tabs 30. Thus in each of the three planes of contact there are four spaced-apart points of contact providing good stable engagement between the spring clip and the fitting and pipe. Also, it is virtually impossible to pull the fitting out of the pipe.

Because it is almost impossible to separate the pipe and the fitting once they are pushed together with the spring clip between, the structural member to be built should first be constructed without the spring clips. All pipe should be accurately cut to size and inserted over their fittings without the use of clips until the ends of the pipes 36 abut against the shoulder 37 on the fitting. The frictional engagement between the spaced contact portions 13 of the fitting and the inner wall of the pipe is sufficient to hold the pipe and fitting together. After all adjustments are made in pipe length and the builder is satisfied with his device the spring clips are added to each joint. The spring clip is first pushed over the projection of the fitting until the spur 27 locks into the notch 16 in the floor of the groove 14, and thereafter the pipe is pushed over the spring clip until the end of the pipe engages the shoulder of the flange.

The spring clip is completely hidden by the pipe, and no changes are made in the final dimensions of the device by the insertion of the spring clip.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A fitting and spring clip for connection to a pipe positioned around said fitting comprising in combination; a fitting having an end for projection into said pipe, said end including a plurality of radially spaced contact portions for engagement with the inner surface of said pipe and including a plurality of spaced longitudinally extending grooves intermediate said contact portions the bottoms of said grooves being spaced from said pipe; and a spring clip having a transverse portion positioned adjacent the end of said fitting within said pipe, and having a plurality of radially spaced fitting-engaging spring tabs connected to said transverse portion and extending longitudinally of the end of said fitting within said grooves for spring engagement with the walls of said grooves, and having a plurality of pipe-engaging spring tabs connected to said transverse portion intermediate said fitting-engaging spring tabs and extending radially outwardly for engaging the inner surface of said pipe.

2. A fitting and spring clip for connection to a pipe positioned around said fitting comprising in combination, a fitting having an end portion for close fitting projection into said pipe, said end portion having a plurality of radially spaced longitudinally extending grooves; and a spring clip having a transverse portion positioned adjacent the end of said fitting within said pipe and having a plurality of radially spaced fitting-engaging spring tabs connected to said transverse portion and extending longitudinally within said grooves for spring engagement with the walls thereof, and having a plurality of pipe-engaging spring tabs connected to said transverse portion intermediate said fitting-engaging spring tabs and extending radially outwardly for engaging the inner surface of said pipe.

3. A fitting and spring clip for connection to a pipe positioned around said fitting comprising, in combination; a fitting having an end portion for close fitting projection into said pipe, said end portions having a plurality of radially spaced longitudinally extending grooves; and a spring clip having a transverse central portion and a first and second plurality of radially extending engaging tabs connected to said transverse portion, the tabs of said first plurality alternating with the tabs of said second plurality radially around said central portion and the ends of said first plurality terminating in a plane longitudinally offset from the plane defined by the ends of the tabs in said seond plurality, said first plurality of tabs engaging said fitting within said grooves, and said second plurality of tabs engaging a pipe around said fitting.

4. A fitting and spring clip for connection to a pipe positioned around said fitting comprising, in combination; a fitting having an end portion for close fitting projection into said pipe, said end portion having a plurality of radially spaced longitudinally extending grooves; and a spring clip having a transverse central portion and a first and a second plurality of radially extending engaging tabs connected to said transverse portion, the tabs of said first plurality alternating with the tabs of said second plurality radially around said central portion and the ends of said first plurality terminating in a plane longitudinally offset from the plane defined by the ends of the tabs in said second plurality, each of said first plurality of tabs engaging said fitting within said grooves and each also having an outwardly extending portion for engaging the pipe around said fitting, and each of said second plurality of tabs also engaging the pipe around said fitting.

5. A fitting and spring clip for connection to a round pipe positioned around said fitting, comprising in combination; a fitting having an end for projection into and engagement with said pipe, said end having a plurality of flat faces alternating with a plurality of longitudinally extending grooves the bottoms of which are spaced from the internal round wall of said pipe, and a spring clip having a transverse portion to fit over the projecting end of said fitting and having a plurality of fitting and pipe engaging spring tabs connected to the edge of said transverse portion and adapted to lie in said plurality of grooves, said spring tabs having a first and second spaced apart pipe engaging portions lying in two planes transverse to the longitudinal axis of said fitting and a plurality of fitting engaging spurs located intermediate said two planes.

6. In a fitting and spring clip combination for connecting the fitting to a pipe positioned around the pipe and wherein the fitting has an end portion for projection into the pipe which includes a plurality of radially spaced contact portions for engagement with the inner surface of said pipe and which includes a plurality of spaced longitudinally extending grooves intermediate said contact portions the bottoms of which grooves are spaced from said pipe; the sub-combination which comprises, a spring clip having a transverse portion positioned adjacent the end of said fitting within said pipe, said clip having a plurality of radially spaced fitting-engaging spring tabs connected to said transverse portion and extending longitudinally of the end of said fitting within said grooves for spring engagement with the walls of said grooves, and having a plurality of pipe engaging spring tabs connected to said transverse portion located intermediate said fitting-engaging spring tabs and extending radially outwardly for engaging the inner surface of said pipe.

References Cited in the file of this patent

UNITED STATES PATENTS

| | | |
|---|---|---|
| 1,433,163 | Walters | Oct. 24, 1922 |
| 2,111,244 | Hueglin | Mar. 15, 1938 |
| 2,218,581 | Levan | Oct. 22, 1940 |
| 2,470,631 | McClellan | May 17, 1949 |
| 2,498,590 | Straus | Feb. 21, 1950 |
| 2,618,009 | Tinnerman | Nov. 18, 1952 |
| 2,644,978 | Becker | July 14, 1953 |
| 2,670,226 | Becker | Feb. 23, 1954 |